United States Patent [19]

Lassiter et al.

[11] Patent Number: 5,268,031
[45] Date of Patent: Dec. 7, 1993

[54] PUMPABLE CERAMIC FIBER COMPOSITION

[75] Inventors: Perry B. Lassiter; David J. Messina, both of Johnson City, Tenn.

[73] Assignee: Premier Refractories and Chemicals Inc., King of Prussia, Pa.

[21] Appl. No.: 322,270

[22] Filed: Mar. 10, 1989

[51] Int. Cl.$^5$ ............................................. C04B 12/04
[52] U.S. Cl. .................................... 106/634; 106/632
[58] Field of Search ............... 106/84, 83, 600, 632, 106/634

[56] References Cited

U.S. PATENT DOCUMENTS

| | | | |
|---|---|---|---|
| 3,146,828 | 7/1964 | Mann | 106/84 |
| 3,184,321 | 5/1965 | Heuer et al. | 501/116 |
| 3,208,862 | 9/1965 | Davies et al. | 501/116 |
| 3,240,615 | 3/1966 | Martinet et al. | 501/116 |
| 3,262,793 | 7/1966 | Neely et al. | 501/116 |
| 3,406,029 | 10/1968 | Farrington et al. | 501/116 |
| 3,442,671 | 5/1969 | Rolland et al. | 106/84 |
| 3,752,682 | 8/1973 | Nameishi et al. | 106/84 |
| 3,752,683 | 8/1973 | Hawthorne | 106/84 |
| 3,897,256 | 7/1975 | Murton | 106/84 |
| 4,040,847 | 8/1977 | Miller | 106/69 |
| 4,072,530 | 2/1978 | Hirame et al. | 106/84 |
| 4,166,748 | 9/1979 | Cassens, Jr. | 501/116 |
| 4,168,177 | 9/1979 | Indelicato et al. | 106/62 |
| 4,174,331 | 11/1979 | Myles | 260/29.1 R |
| 4,248,752 | 2/1981 | Myles | 260/29.1 R |
| 4,389,282 | 6/1983 | Yonushonis et al. | 162/145 |
| 4,417,925 | 11/1983 | Cherry | 106/85 |
| 4,510,253 | 4/1985 | Felice et al. | 501/95 |

Primary Examiner—Mark L. Bell
Assistant Examiner—C. M. Bonner
Attorney, Agent, or Firm—Ostrolenk, Faber, Gerb & Soffen

[57] ABSTRACT

A pumpable ceramic fiber composition having, by weight, from about 20% to about 30% of ceramic fiber, from about 5% to about 10% of a sodium silicate binding agent, from at least 1% to less than 5% of a binder migration retarding agent, from about 0.5 to about 2.5% of a viscosity modifying and lubricating agent, and from about 60% to about 70% of a liquid vehicle, preferably water. The pumpable ceramic fiber composition is resistant to deterioration under repeated freezing and thawing cycles.

2 Claims, No Drawings

PUMPABLE CERAMIC FIBER COMPOSITION

BACKGROUND OF THE INVENTION

The present invention relates to pumpable refractory compositions and, more particularly, to a pumpable ceramic fiber composition resistant to deterioration under repeated freezing and thawing cycles.

Various lightweight, insulating ceramic fiber refractory compositions are available in pre-formed shapes, blankets, bricks and panels. These materials are frequently used in furnace interiors because of their light weight which reduces heat storage and, therefore, conserves fuel and reduces furnace heat-up time. Unfortunately, the use of such refractory compositions is limited to relatively simple shapes and to applications such as lining industrial furnaces and the like. To compliment such formed ceramic fiber refractory products of definite dimensions, pumpable insulating refractory compositions comprising ceramic fiber, an aqueous binder system, and a liquid vehicle carrier have been developed. Such pumpable insulating refractory compositions are formed into the desired shape in-place in the desired location. The liquid vehicle carrier is then evaporated from the pumpable refractory composition with heated air so as to set the refractory composition in its final shape.

Because such pumpable ceramic fiber compositions must remain pumpable until such time as a customer intends to use it, such ceramic fiber compositions are shipped and stored in air-tight and water-tight containers. However, during shipping and storage such pumpable refractory fiber compositions are often subjected to sufficiently low temperatures such that freezing of the aqueous portion of the composition may occur. In fact, such compositions are often subjected to repeated cycles of freezing and thawing during shipping and storage.

In many conventional prior art pumpable ceramic fiber compositions, colloidal silica comprises the binder system. For example, U.S. Pat. Nos. 4,040,847; 4,174,331; and 4,248,752 each discloses a moldable ceramic fiber composition comprised of ceramic fiber with water as a liquid vehicle and colloidal silica as the binding system. In such prior art compositions containing colloidal silica as the binding system and water as the liquid vehicle carrier, subjecting the pumpable ceramic fiber composition to freezing has caused the colloidal silica to precipitate out of the system and the fiber mix, thereby, substantially deteriorating the product. In the aforementioned U.S. Pat. No. 4,040,847, the problem of deterioration of the colloidal silica binder system as a result of freezing is addressed. The solution proposed therein is to add ethylene glycol to the colloidal silica binder.

Accordingly, it is an object of the present invention to provide a pumpable ceramic fiber mixture which incorporates a binder which is resistant to deterioration under repeated freezing and thawing cycles and does not include ethylene glycol thereby, avoiding potential health hazards associated with ethylene glycol.

Additionally, it is a further object of the present invention to provide such a stable pumpable ceramic fiber composition which has good pumpability, high insulating value, high strength, good resistance to shrinkage at elevated temperatures, and which may be installed in a cold or hot operating boiler or furnace wall.

SUMMARY OF THE INVENTION

The pumpable ceramic fiber composition of the present invention comprises, by weight, from about 20% to about 30% of ceramic fiber, from about 5% to about 10% of a sodium silicate binder agent, from at least 1% to less than 5% by weight of a binder migration retarding agent, from 0.5% to 2.5% of a viscosity modifying and lubricating agent, and from about 60% to about 70% of a liquid vehicle, preferably water. Such a pumpable ceramic fiber composition has been found to be resistant to deterioration under repeated freezing and thawing cycles and, therefore remains stable and retains its good pumpability, high insulating value, high strength and high resistance to shrinkage at elevated temperatures even after being exposed to repeated freezing and thawing cycles during shipping and storage.

DETAILED DESCRIPTION OF THE PREFERRED EMBODIMENTS

A better understanding of the invention will be obtained from the following detailed description of the pumpable ceramic fiber composition of the present invention and its ingredients.

The pumpable ceramic fiber composition of the present invention contains a suitable liquid vehicle, most preferably water; ceramic fiber; sodium silicate as a binding agent; a binder migration retarding agent; and a viscosity modifying and lubricating agent. The present invention provides a highly moldable, air-setting, insulating refractory composition that is readily pumpable into cavities in boiler or furnace walls, and may be troughed, tamped, rammed or otherwise formed into any desirable shape or object.

The refractory composition of the present invention comprises the following ingredients wherein the preferred composition range is recited.

| Ingredient | Composition Range % By Weight |
| --- | --- |
| Ceramic Fiber | 20%–30% |
| Sodium Silicate | 5%–10% |
| Migration Retardant | 1%–5% |
| Viscosity Modifying/Lubricating Agent | 0.5%–2.5% |
| Liquid Vehicle | 60%–70% |

The major component by weight of the pumpable refractory composition of the present invention is the liquid vehicle which may be present in amount from about 60% to about 70% by weight of the composition. Of course, the liquid vehicle that is employed must be a non-solvent for the ceramic fiber, but should be a solvent for the viscosity modifying and lubricating agent. Water is the most preferred liquid vehicle for most applications, but other liquid vehicles previously identified in the prior art as suitable for particular applications, such as methanol, ethanol, ethylene glycol, diethylene glycol and mixtures thereof, including mixtures with water, may also be used if desired.

The second most abundant ingredient by bulk in the moldable refractory composition of the present invention is the ceramic fiber which may be present in amount from about 20% to about 30% by weight of the composition. Although any refractory ceramic fiber may be employed in the mixture of the present invention, the ceramic fiber is preferably selected from the group consisting of alumina fibers, alumina silicate fibers, mullite fibers, chrome-containing fibers, and mixtures thereof, with fibers of aluminum silicate being the most preferred of this group. Ceramic fibers of this grouping are readily commercially available and are sold, for example, by Premier Refractories and Chemicals Inc. under the trade name "CER-WOOL", by the Babcock and Wilcox Company under the trade name "KAOWOOL", by the Carborundum Company under the trademark "FIBERFARX", and by Johns-Manville, Inc. under the trademark "CERAWOOL". Other ceramic fibers include boron oxide, boron carbide, boron nitride, silica, silican nitride, silican carbide, glass, mineral wool, zirconia fibers, alumina-zirconia-silica fibers, and mixtures thereof.

Although the particular ceramic fiber used is unimportant to the essence of the invention, it is important from an application standpoint. As is well known, a particular ceramic fiber may be suitable only for a limited temperature range. One type of ceramic fiber may be preferred for very high temperature applications, while a different less expensive ceramic fiber or other inorganic fiber may be suitable for a lower temperature application.

The next most abundant ingredient by bulk in the refractory ceramic fiber composition of the present invention is the binding agent. In accordance with the present invention, the binding agent comprises sodium silicate which is present in the range from about 5% to about 10% by weight of the refractory ceramic fiber composition. It is the use of sodium silicate as a binding agent which imparts to the pumpable ceramic fiber composition of the present invention its resistance to deterioration after repeated freezing and thawing cycles. Unlike colloidal silica, which is conventionally used as the binding agent in prior art one component pumpable ceramic fiber insulating compositions, sodium silicate is resistant to gelling upon freezing at temperatures below 0° C. When prior art ceramic fiber compositions containing colloidal silica as a binder were exposed to freezing and thawing, the composition deteriorated as the colloidal silica lost its ability to bond ceramic fibers and particulates, and is also no longer pumpable, as a result of its gelling upon freezing. However, it has been found that a pumpable ceramic fiber composition employing sodium silicate as the binding agent may be frozen and thawed through many cycles without deterioration of its ability to bond ceramic fibers and particulates.

It should be noted that the amount of sodium silicate added to the composition as the binding agent should be limited to no more than about 10% by weight. Ceramic fiber compositions containing substantially more than about 10% by weight of sodium silicate as a binding agent are subject to increased fluxing and high temperature shrinkage caused by high levels of sodium oxide formed in the composition upon curing. However, as sodium silicate is a strong binding agent, sodium silicate has been found to be an effective binder for the pumpable ceramic fiber composition of the present invention at percentages ranging from about 5% to about 10% by weight of the composition. In fact, the refractory composition of the present invention incorporating sodium silicate as a binding agent at these levels has comparable strength to conventional prior art pumpable ceramic fiber compositions utilizing colloidal silica as a binding agent.

An additional necessary ingredient of the pumpable ceramic fiber composition of the present invention is a binder migration retarding agent. Since sodium silicate tends to migrate to the surface of the ceramic body formed from the ceramic fiber composition upon drying and curing of the composition, a binder migration retardant must be added to limit binder migration to acceptable levels. The preferred binder migration retardant for use in the pumpable ceramic fiber composition of the present invention is smectite clay minerals, in particular hydrated ma slum aluminosilicates. One such preferred binder retardant is commercially available hydrated magnesium aluminosilicate sold under the product name VEEGUM-T by R.T. Vanderbilt Corporation. It has been found that the amount of binder migration retardant added to the pumpable ceramic fiber composition of the present invention should be limited to less than 5% by weight as amounts significantly in excess of this percentage resulted in reduced pumpability of the refractory composition of the present invention. However, substantial reduction in binder migration was observed with the binder migration retardant being present in the composition in amounts as little as 1% by weight.

The final necessary ingredient in the pumpable ceramic fiber composition of the present invention is a viscosity modifying and lubricating agent which may be present in the amount of from about 0.5% to about 2.5% by weight of the composition and comprise a polymer selected from the group consisting of acrylamide polymers, acrylate polymers, acrylamide/acrylate copolymers and mixtures thereof. As noted previously, the viscosity modifier and lubricating agent should be soluble in the liquid vehicle. As water is most typically the liquid vehicle, the polymer selected should be soluble in water. One particularly preferred form of the viscosity modifying and lubricating agent is a commercially available acrylamide/acrylate polymer with hydrocarbon solvent in water sold under the product POLYMER 2388 by Nalco Chemical Company, although other commercially available acrylamide homopolmers acrylate polymers, and copolymers of acrylamide and acrylate would be equally suitable.

A preferred composition for the pumpable ceramic fiber of the present invention consists essentially of about 23.1% by weight ¼" length chopped aluminum silicate ceramic fibers, about 6.8% by weight sodium silicate binding agent, about 2.8% by weight hydrated magnesium aluminosilicate binder migration retardant, about 1% by weight acrylamide/acrylate copolymer as a viscosity modifier and lubricant, and about 66.3% water as the liquid vehicle carrier.

A particular advantage of the pumpable, single component ceramic fiber composition of the present invention is that even after repeated freezing and thawing cycles, it retains its good pumpability, its high insulating value, its high strength characteristics, and its excellent resistance to shrinkage at elevated temperatures.

We claim:

1. A pumpable ceramic fiber composition resistant to deterioration under repeated freezing and thawing cycles, comprising:
   a) from about 20% to about 30% by weight of ceramic fiber;
   b) from about 5% to about 10% by weight of a sodium silicate binding agent;
   c) from at least 1% to less than 5% by weight of a binder migration retarding agent;

d) from about 0.5% to about 2.5% by weight of a viscosity modifying and lubricating agent, said viscosity modifying and lubricating agent including a polymer selected from the group consisting of acrylamide polymers, acrylate polymers, acrylamide/acrylate copolymers and mixtures thereof; and e) from about 60% to about 70% by weight of a liquid vehicle carrier.

2. A pumpable ceramic fiber composition resistant to deterioration under repeated freezing and thawing cycles, consisting essentially of:

a. about 23.1% by weight of ceramic fiber;
b. about 6.8% by weight of a sodium silicate binding agent;
c. about 2.8%, by weight of a hydrated magnesium aluminosilicate for retarding binder migration;
d. about 1.0% by weight of an acrylamide/acrylate copolymer as a viscosity modifying and lubricating agent; and
e. about 66.3% by weight water.

* * * * *